(12) United States Patent
Wang

(10) Patent No.: US 7,412,555 B2
(45) Date of Patent: Aug. 12, 2008

(54) ORDERING RULE AND FAIRNESS IMPLEMENTATION

(75) Inventor: James Wang, Milpitas, CA (US)

(73) Assignee: P.A. Semi, Inc., Santa Clara, CA (US)

( * ) Notice: Subject to any disclaimer, the term of this patent is extended or adjusted under 35 U.S.C. 154(b) by 176 days.

(21) Appl. No.: 11/238,849

(22) Filed: Sep. 29, 2005

(65) Prior Publication Data

US 2007/0073954 A1   Mar. 29, 2007

(51) Int. Cl.
*G06F 13/36* (2006.01)
(52) U.S. Cl. ...................... 710/310; 710/309
(58) Field of Classification Search ........... 710/309, 710/310
See application file for complete search history.

(56) References Cited

U.S. PATENT DOCUMENTS

| | | | | |
|---|---|---|---|---|
| 5,247,672 | A * | 9/1993 | Mohan | 711/152 |
| 6,070,209 | A * | 5/2000 | Hausauer | 710/104 |
| 6,230,228 | B1 * | 5/2001 | Eskandari et al. | 710/310 |
| 6,449,701 | B1 * | 9/2002 | Cho | 711/154 |
| 6,856,944 | B2 * | 2/2005 | Hady et al. | 702/188 |
| 7,139,859 | B2 * | 11/2006 | Dastidar et al. | 710/306 |
| 7,162,546 | B2 * | 1/2007 | Creta et al. | 710/5 |
| 2004/0064623 | A1 * | 4/2004 | Solomon | 710/305 |

OTHER PUBLICATIONS

PCI Express, "PCI Express(TM) Base Specification," Revision 1.0a, Apr. 15, 2003, pp. 90-97.

* cited by examiner

*Primary Examiner*—Mark Rinehart
*Assistant Examiner*—Christopher A Daley
(74) *Attorney, Agent, or Firm*—Lawrence J. Merkel; Meyertons, Hood, Kivlin, Kowert & Goetzel, P.C.

(57) ABSTRACT

In one embodiment, a controller comprises one or more transaction queues, one or more age counter circuits, and a control circuit. The transaction queues are configured to store a plurality of transaction requests, each having a transaction type. The age counter circuits are configured to generate one or more age counters, where each age counter corresponds to a respective pair of transaction types. Coupled to receive an indication of an input transaction type corresponding to an input transaction request to the controller and coupled to the age counter circuits, the control circuit is configured to select at least one of the plurality of age counters to be stored with the input transaction request in the one or more transaction queues, each of the selected counters indicative of a relative age of the input transaction request with transaction requests of another transaction type.

21 Claims, 5 Drawing Sheets

$$NP\_OT\_P = (P\text{'s P-NP CTR} - NP\text{'s P-NP CTR}) \text{ MOD } 2^M < 2^{M-1}$$

$$NP\_OT\_CP = (CP\text{'s NP-CP CTR} - NP\text{'s NP-CP CTR}) \text{ MOD } 2^M < 2^{M-1}$$

$$CP\_OT\_P = (P\text{'s P-CP CTR} - CP\text{'s P-CP CTR}) \text{ MOD } 2^M < 2^{M-1}$$

Fig. 4

| NP_OT_P | NP_OT_CP | CP_OT_P | Relative Age |
|---|---|---|---|
| 0 | 0 | 0 | P > CP > NP |
| 0 | 0 | 1 | CP > P > NP |
| 0 | 1 | 0 | P > NP > CP |
| 0 | 1 | 1 | NA |
| 1 | 0 | 0 | NA |
| 1 | 0 | 1 | CP > NP > P |
| 1 | 1 | 0 | NP > P > CP |
| 1 | 1 | 1 | NP > CP > P |

Fig. 5

$$M = 1 + \log_2[\text{MAX}(\text{LowSpeedQueueSize}, \text{HighSpeedQueueSize} + 1)]$$

Fig. 6

ORDERING RULE AND FAIRNESS IMPLEMENTATION

BACKGROUND

1. Field of the Invention

This invention is related to the field of peripheral interfaces and, more particularly, to ordering rules and fairness for transactions on such interfaces.

2. Description of the Related Art

Peripheral interface specifications typically specify transaction ordering rules for transactions communicated over the interface. For example, the Peripheral Component Interconnect (PCI) Express™ specification specifies ordering rules among posted transactions, nonposted transactions, and completions. The transaction ordering rules may be designed to prevent deadlock in the system, as well as to ensure the producer-consumer model is supported.

Among other things, the PCI Express (PCIe) ordering rules require that the posted transactions be able to pass nonposted transactions and completions. That is, if a nonposted transaction or completion is blocked from transmission and the posted transaction is not blocked, the posted transaction must be permitted to be transmitted, even if the posted transaction is queued behind the blocked transaction, is younger than the blocked transaction, etc. Similarly, completions must be able to pass nonposted transactions. Other ordering rules may permit passing of transactions, or permit passing of transactions in certain cases. Still other ordering rules do not permit passing in some cases.

Transactions may be blocked due to a lack of resources for handling the transaction. For example, a credit-based system is often used to track available resources in a receiver of a transaction. Credits may be maintained for each available resource for handling a given transaction type, and a credit may be consumed when a transaction of that type is transmitted by a transmitter (and thus consumes the resource in the receiver). The credit is returned to the transmitter when the transaction completes or otherwise frees the resource. If no credit is available for a given transaction type, transactions of that type are blocked until the credit becomes available. A given device on the peripheral interface may be both a transmitter and a receiver of transactions.

Implementing the ordering rules correctly while supporting high performance and fairness among transaction types is complex and error prone. A simple implementation makes posted transactions high priority, completions medium priority, and nonposted transactions low priority. In such an implementation, posted transactions would always pass completions and nonposted transactions, and completions would always pass nonposted transactions. However, such an implementation would not support fairness very well, since the nonposted transactions are only transmitted when there are no posted transactions or completions, regardless of how long the nonposted transactions have been queued awaiting transmission.

Other implementations use a single age counter to track the age of transactions. As each transaction request is received, it is assigned the current value of the age counter and the counter is incremented. By comparing age counter values assigned to each transaction, the age of transactions may be determined. If two transactions are both able to be transmitted, the older transaction can be selected. However, since some transactions can pass others, the age counter can never be made large enough to ensure that it will not overflow. For example, a long string of posted transactions passing a nonposted transaction that is blocked may cause the age counter to overflow, and age information may be lost. Typically, complex logic must be implemented to properly handle the overflow case and not lose age information among the queued transactions.

SUMMARY

In one embodiment, a controller comprises one or more transaction queues, one or more age counter circuits, and a control circuit. The transaction queues are configured to store a plurality of transaction requests, each having a transaction type. The age counter circuits are configured to generate one or more age counters, where each of the age counters corresponds to a respective pair of transaction types. Coupled to receive an indication of an input transaction type corresponding to an input transaction request to the controller and coupled to the age counter circuits, the control circuit is configured to select one or more of the age counters to be stored with the input transaction request in the one or more transaction queues, each of the selected counters indicative of a relative age of the input transaction request with transaction requests of another transaction type. A method is also contemplated.

In another embodiment, a controller is coupled to receive an input transaction request having an input transaction type that is one of a plurality of transaction types. The controller comprises at least one age counter circuit configured to generate at least one age counter and a control circuit coupled to the age counter circuit. The age counter corresponds to a pair of the plurality of transaction types and is maintained to indicate a relative age of transaction requests having the pair of transaction types. The control circuit is configured to update the age counter responsive to the input transaction type being one of the pair of transaction types and further responsive to the input transaction type differing from a most recent transaction type of the pair, wherein the most recent transaction type corresponds to a most recent transaction request of transaction requests having one of the pair of transaction types.

BRIEF DESCRIPTION OF THE DRAWINGS

The following detailed description makes reference to the accompanying drawings, which are now briefly described.

FIG. 4 is a set of formulas defining relative age of transactions for one embodiment.

FIG. 5 is a table of relative age results and corresponding orders of relative age for one embodiment.

FIG. 6 is a formula for minimum age counter size for one embodiment.

Figure 1:
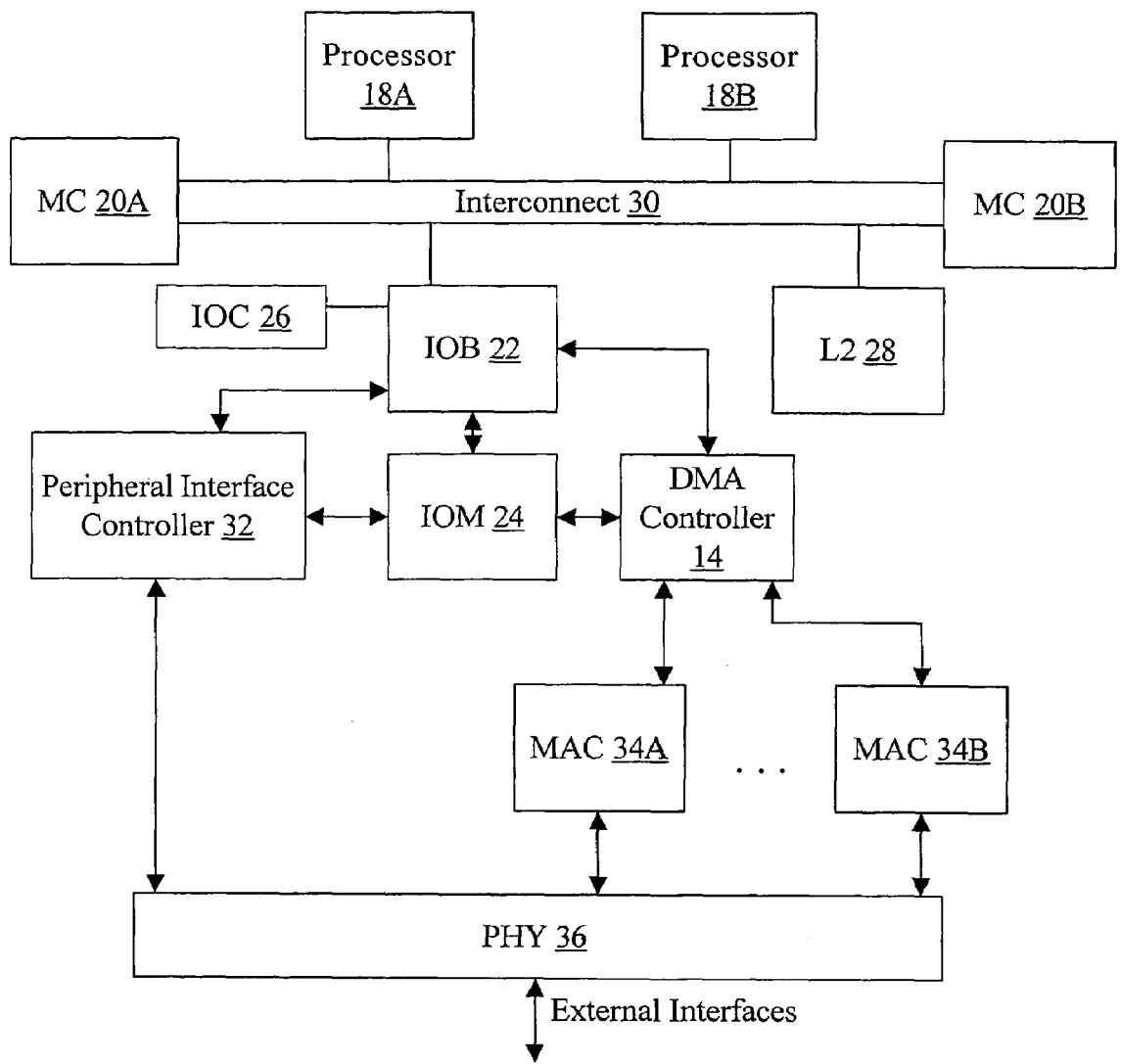
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

System Overview

Turning now to FIG. 1, a block diagram of one embodiment of a system 10 is shown. In the illustrated embodiment, the system 10 includes one or more processors such as processors 18A-18B, one or more memory controllers such as memory controllers 20A-20B, an I/O bridge (IOB) 22, an I/0 memory (IOM) 24, an I/O cache (IOC) 26, a level 2 (L2) cache 28, an interconnect 30, a DMA controller 14, a peripheral interface controller 32, one or more media access control circuits (MACs) such as MACs 34A-34B and a physical interface layer (PHY) 36. The peripheral interface controller 32 and the MACs 34A-34B are coupled to the physical interface layer 36, which is further coupled to one or more external interfaces. The processors 18A-18B, memory controllers 20A-20B, IOB 22, and L2 cache 28 are coupled to the interconnect 30. The IOB 22 is further coupled to the IOC 26 and the IOM 24. The DMA controller 14 is also coupled to the IOB 22 and the IOM 24, and to the MACs 34A-34B. The peripheral interface controller 32 is also coupled to the IOB 22 and the IOM 24. In some embodiments, the components of the system 10 may be integrated onto a single integrated circuit as a system on a chip. In other embodiments, the system 10 may be implemented as two or more integrated circuits.

The peripheral interface controller 32 comprises circuitry configured to control a peripheral interface. Generally, a peripheral interface may comprise any communication medium and logical protocol on that communication medium that permits various devices to be connected and communicate. Peripheral devices may include various input/output (I/O) devices. In one embodiment, the peripheral interface controller 32 may control a peripheral component interconnect (PCI) Express (PCIe) interface. Other embodiments may implement other peripheral interfaces (e.g. PCI, PCI-X, universal serial bus (USB), etc.). The PCIe interface will be used as an example below, but any other interface may be used in other embodiments.

The DMA controller 14 is configured to perform DMA transfers between at least the MACs 34A-34B and the host address space (e.g. memory controlled by the memory controllers 20A-20B, and other addresses in the address space). Particularly, the DMA transfers may be between memory locations and the MACS 34A-34B. Additionally, the DMA controller 14 may, in some embodiments, be configured to perform DMA transfers between sets of memory locations. In some embodiments, the DMA controller 14 may further comprise a DMA assist for the peripheral interface controller 32. The DMA controller 14 may also be configured to perform one or more operations (or "functions") on the DMA data as the DMA data is being transferred, in some embodiments. In one embodiment, some of the operations that the DMA controller 14 performs are operations on packet data (e.g. encryption/decryption, cyclical redundancy check (CRC) generation or checking, checksum generation or checking, etc.). The operations may also include an exclusive OR (XOR) operation, which may be used for redundant array of inexpensive disks (RAID) processing, for example.

The processors 18A-18B comprise circuitry to execute instructions defined in an instruction set architecture implemented by the processors 18A-18B. Any instruction set architecture may be implemented in various embodiments. For example, the PowerPC™ instruction set architecture may be implemented. Other exemplary instruction set architectures may include the ARM™ instruction set, the MIPS™ instruction set, the SPARC™ instruction set, the x86 instruction set (also referred to as IA-32), the IA-64 instruction set, etc.

The memory controllers 20A-20B comprise circuitry configured to interface to memory. For example, the memory controllers 20A-20B may be configured to interface to dynamic random access memory (DRAM) such as synchronous DRAM (SDRAM), double data rate (DDR) SDRAM, DDR2 SDRAM, Rambus DRAM (RDRAM), etc. The memory controllers 20A-20B may receive read and write transactions for the memory to which they are coupled from the interconnect 30, and may perform the read/write operations to the memory. The read and write transactions may include read and write transactions initiated by the IOB 22 on behalf of the DMA controller 14 and/or the peripheral interface controller 32. Additionally, the read and write transactions may include transactions generated by the processors 18A-18B and/or the L2 cache 28.

The L2 cache 28 may comprise a cache memory configured to cache copies of data corresponding to various memory locations in the memories to which the memory controllers 20A-20B are coupled, for low latency access by the processors 18A-18B and/or other agents on the interconnect 30. The L2 cache 28 may comprise any capacity and configuration (e.g. direct mapped, set associative, etc.).

The IOB 22 comprises circuitry configured to communicate transactions on the interconnect 30 on behalf of the DMA controller 14 and the peripheral interface controller 32. The interconnect 30 may support cache coherency, and the IOB 22 may participate in the coherency and ensure coherency of transactions initiated by the IOB 22. In the illustrated embodiment, the IOB 22 employs the IOC 26 to cache recent transactions initiated by the IOB 22. The IOC 26 may have any capacity and configuration, in various embodiments, and may be coherent. The IOC 26 may be used, e.g., to cache blocks of data which are only partially updated due to reads/writes generated by the DMA controller 14 and the peripheral interface controller 32. Using the IOC 26, read-modify-write sequences may be avoided on the interconnect 30, in some cases. Additionally, transactions on the interconnect 30 may be avoided for a cache hit in the IOC 26 for a read/write generated by the DMA controller 14 or the peripheral interface controller 32 if the IOC 26 has sufficient ownership of the cache block to complete the read/write. Other embodiments may not include the IOC 26.

The IOM 24 may be used as a staging buffer for data being transferred between the IOB 22 and the peripheral interface 32 or the DMA controller 14. Thus, the data path between the IOB 22 and the DMA controller 14/peripheral interface controller 32 may be through the IOM 24. The control path (including read/write requests, addresses in the host address space associated with the requests, etc.) may be between the IOB 22 and the DMA controller 14/peripheral interface controller 32 directly. The IOM 24 may not be included in other embodiments.

The interconnect 30 may comprise any communication medium for communicating among the processors 18A-18B, the memory controllers 20A-20B, the L2 cache 28, and the IOB 22. For example, the interconnect 30 may be a bus with coherency support. The interconnect 30 may alternatively be a point-to-point interconnect between the above agents, a packet-based interconnect, or any other interconnect.

The MACs 34A-34B may comprise circuitry implementing the media access controller functionality defined for network interfaces. For example, one or more of the MACs 34A-34B may implement the Gigabit Ethernet standard. One or more of the MACs 34A-34B may implement the 10 Gigabit Ethernet Attachment Unit Interface (XAUI) standard.

Other embodiments may implement other Ethernet standards, such as the 10 Megabit or 100 Megabit standards, or any other network standard. In one implementation, there are 6 MACs, 4 of which are Gigabit Ethernet MACs and 2 of which are XAUI MACs. Other embodiments may have more or fewer MACs, and any mix of MAC types. Among other things, the MACs 34A-34B that implement Ethernet standards may strip off the inter-frame gap (IFG), the preamble, and the start of frame delimiter (SFD) from received packets and may provide the remaining packet data to the DMA controller 14 for DMA to memory. The MACs 34A-34D may be configured to insert the IFG, preamble, and SFD for packets received from the DMA controller 14 as a transmit DMA transfer, and may transmit the packets to the PHY 36 for transmission.

The PHY 36 may generally comprise the circuitry configured to physically communicate on the external interfaces to the system 10 under the control of the peripheral interface controller 32 and/or the MACs 34A-34B. In one particular embodiment, the PHY 36 may comprise a set of serializer/deserializer (SERDES) circuits that may be configured for use as PCI Express lanes or as Ethernet connections. The PHY 36 may include the circuitry that performs 8b/10b encoding/decoding for transmission through the SERDES and synchronization first-in, first-out (FIFO) buffers, and also the circuitry that logically configures the SERDES links for use as PCI Express or Ethernet communication links. In one implementation, the PHY may comprise 24 SERDES that can be configured as PCI Express lanes or Ethernet connections. Any desired number of SERDES may be configured as PCI Express and any desired number may be configured as Ethernet connections.

It is noted that, in various embodiments, the system 10 may include one or any number of any of the elements shown in FIG. 1 (e.g. processors, memory controllers, caches, I/O bridges, DMA controllers, peripheral interface controllers, and/or MACs, etc.).

Peripheral Interface Controller

Figure 2:
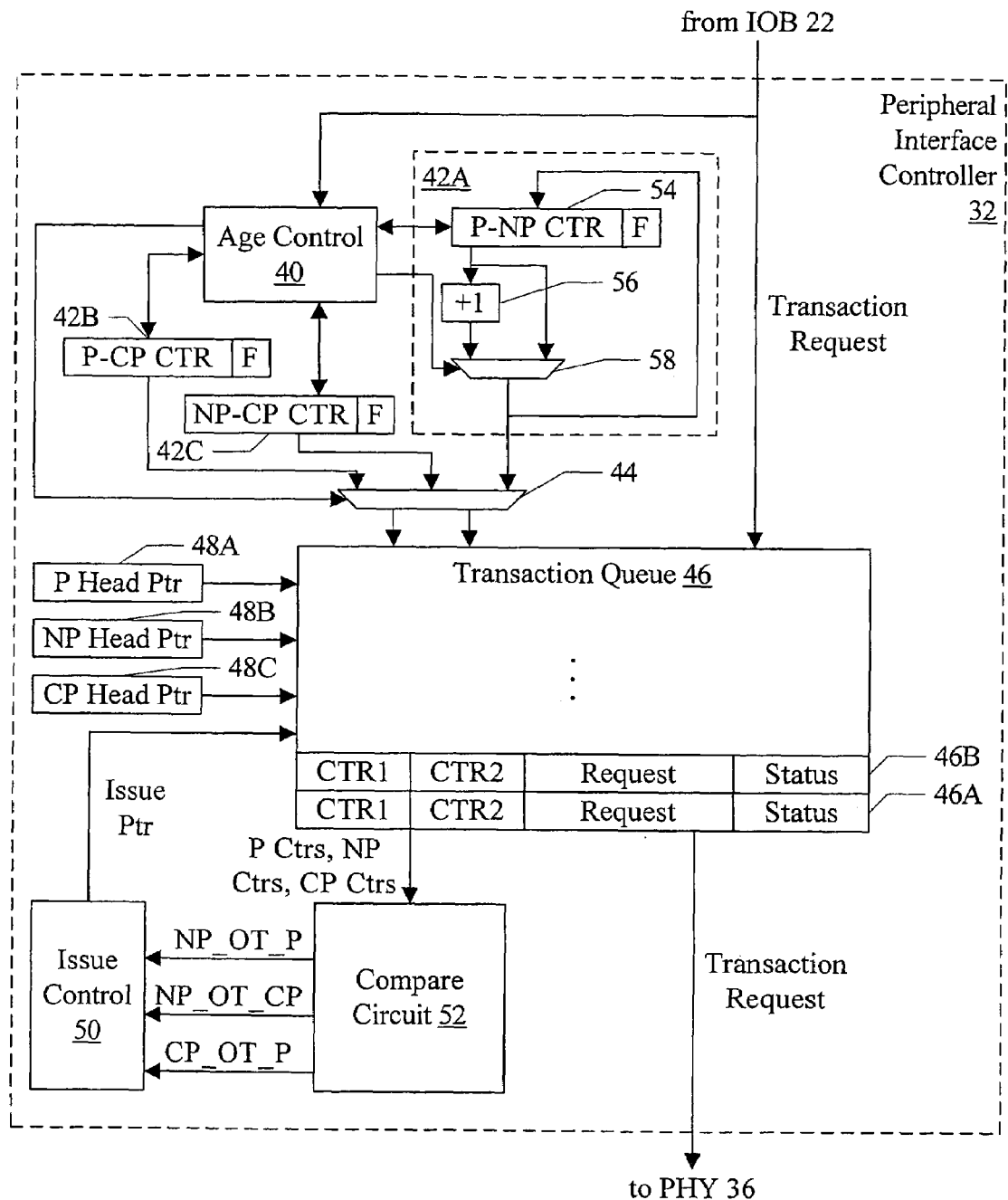
FIG. 2 is a block diagram of one embodiment of a peripheral interface controller.

Turning now to FIG. 2, a block diagram of one embodiment of a portion of the peripheral interface controller 32 is shown. The portion shown in FIG. 2 includes circuitry involved in receiving transaction requests from the IOB 22 and forwarding the transaction requests to the PCIe interface (through the PHY 36). Other circuitry, not shown, may handle receiving requests from the interface and other functionality such as forming outgoing requests into PCIe transactions for transmission. In the illustrated embodiment, the peripheral interface controller 32 includes an age control circuit 40, a plurality of age counter circuits 42A-42C, a mux 44, a transaction queue 46, a set of head pointers 48A-48C, an issue control circuit 50, and a compare circuit 52. The transaction queue 46 is coupled to receive transaction requests from the IOB 22 and to provide transaction requests to the PHY 36. The age control circuit 40 is also coupled to receive at least some input transaction request information from the IOB 22 (e.g. the transaction type or information permitting the age control circuit 40 to derive the transaction type). The age control circuit 40 is coupled to the age counter circuits 42A-42C and the mux 44. The age counter circuits 42A-42C are also coupled to the mux 44, which is further coupled to the transaction queue 46. The head pointers 48A-48C are coupled to the transaction queue 46, as is the issue control unit 50. The compare circuit 52 is coupled to receive age counters from the transaction queue 46 and to output comparison results to the issue control circuit 50.

The input transaction requests transmitted by the IOB 22 to the peripheral interface controller 32 each have a transaction type. The transaction type may define a general category of transactions, of which the transaction request is an instance. For example, in the PCIe interface, there are three transaction types: posted transactions, nonposted transactions, and completion transactions (or, more briefly, "completions"). Posted transactions may comprise transactions which are considered to be complete by the transmitter once the transactions have been successfully transmitted on the interface. That is, the transmitter may complete the posted transaction (e.g. releasing resources in the transmitter that are allocated to the transaction) before the posted transaction is completed at its destination. Completions are not required for posted transactions. In PCIe, posted transactions may include memory write transactions and message transactions. Nonposted transactions may comprise transactions for which a positive acknowledgement by the destination of the transaction is needed to complete the transaction at the transmitter. The positive acknowledgement may be, e.g., a completion. The nonposted transactions in PCIe may include memory read transactions (for which the completion includes the data returned in response to the read) as well as I/O and configuration transactions (both read and write). Completions are transactions which complete earlier-issued transactions. Completions may include data completions (e.g. in response to read transactions and including the read data) and non-data completions. Non-data completions may indicate completion of a corresponding transaction and may report errors, if any. Other embodiments may implement other transaction types and/or other interfaces.

The ordering rules for the PCIe specification require that posted transaction requests be able to pass nonposted transaction requests and completion requests, and also require that completion requests be able to pass nonposted transaction requests. These mandatory passing rules are provided for deadlock prevention in various systems that may implement the PCIe specification. There are other cases in the PCIe specification in which passing is permissible, and in which passing among transaction requests of the same transaction type is permissible. For example, nonposted transaction requests and completion requests may pass each other at any time. Certain completion requests (I/O or configuration completions and relaxed-order memory read completions) may pass posted transaction requests. These non-mandatory passing rules may or may not be supported in various embodiments. Additionally, there are cases in which passing among transaction requests is not permitted. For deadlock prevention, generally preferring the issuance of older transactions over younger transactions while allowing posted transaction requests to pass nonposted transaction requests and completion requests, and also allowing completion requests to pass nonposted transaction requests, is sufficient to meet the PCIe specification. That is, the mandatory passing rules for deadlock prevention are supported. Additionally, favoring the issuance of older transactions over younger transactions may promote fairness among the transactions (e.g. preventing starvation of the passable transaction requests if they are older than other transaction requests).

To implement the passing rules while favoring older transaction requests, the relative age of the transaction requests may be used. Transaction requests of a given transaction type may be ordered in the transaction queue 46 by age, and thus the relative age among transaction requests of the same transaction type may be discerned from the order in the queue. The relative age of transaction requests of different transaction types may be discerned using the age counters maintained by the age counter circuits 42A-42C and the age control circuit 40.

Each age counter circuit 42A-42C is assigned to a respective pair of transaction types. That is, there is an age counter circuit 42A-42C for each unique combination of two transaction types. In the present embodiment, there are three transaction types and thus the number of unique combinations of pairs is three. The age counter circuit 42A is assigned to the posted-nonposted (P-NP) pair; the age counter circuit 42B is assigned to the posted-completion (P-CP) pair; and the age counter circuit 42C is assigned to the nonposted-completion (P-NP) pair. A given age counter circuit 42A-42C is configured to maintain an age counter that can be used, over time, to determine the relative age between transaction requests having the pair of transaction types.

Since each age counter is used to track the relative age between a pair of transaction types, the age counter need not be updated for each transaction request received by the peripheral interface controller 32. Additionally, since the order of transactions of the same transaction type is discernible from the order in the queue, a given age counter need not be updated if the transaction type of the input transaction request is the same as the transaction type of the most recent transaction request having one of the pair of types (referred to as the "most recent transaction type").

Accordingly, in one embodiment, each age counter circuit 42A-42C may record the most recent transaction type of the pair assigned to that age counter circuit 42A-42C, in addition to the current age counter. If the input transaction type is one of the pair assigned to a given age counter circuit 42A-42C and differs from the most recent transaction type, the given age counter circuit 42A-42C may update the age counter value.

Implementing the passing rules mentioned above may further reduce the incidence of updating the age counters while still providing ordering information. For each pair of transaction types, one transaction type is defined as being able to pass the other within the mandatory passing rules for deadlock prevention. The transaction type that passes the other transaction type of the pair in the mandatory passing rules is referred to as the high speed transaction type (and transaction requests of that type are referred to as high speed). The transaction type that may be passed by the other transaction type in the mandatory passing rules is referred to as the low speed transaction type (and transaction requests of that type are referred to as low speed). A transaction type being high speed or low speed is relative to the other transaction type of the pair, and thus the same transaction type may be high speed for one age counter and low speed for another. More particularly, in the present embodiment, the posted transaction type is high speed in both its pairs; the nonposted transaction type is low speed in both its pairs; and the completion is high speed in the NP-CP pair and low speed in the P-CP pair. If the nonmandatory passing rules are implemented, the low speed transaction type of a given pair may also be able to pass the high speed transaction type. For example, in PCIe, the NP-CP pair and the P-CP pair may support nonmandatory passing by the low speed transaction type, and the P-NP pair may not support nonmandatory passing.

In one embodiment, a given age counter is updated if the input transaction type differs from the most recent transaction type and if the input transaction type is low speed for the pair. The given age counter is not updated if the input transaction type is the same as the most recent transaction type or if the input transaction type is high speed for the pair. Thus, a low speed transaction and subsequent high speed transactions will have the same age counter, if no other low speed transaction is received. The number of bits required in the age counters to support a given level of performance may be relatively low, in some embodiments, which may reduce the cost of implementation, in some cases. Furthermore, the number of bits in each age counter required to ensure that the counters cannot overflow for any mix of transaction requests may be relatively small. An age counter cannot overflow if a given age counter value cannot be reused for an input transaction before it is no longer in the transaction queue 46 associated with a different transaction request, for any mix of transaction requests. Thus, there is no ambiguity in which transaction request is older, given the age counters recorded with the transaction requests. Complexities required to deal with counter overflow may be avoided in the peripheral interface controller 32.

For each transaction request, the transaction queue 46 may store the age counters from the age counter circuits 42A-42C for which the assigned pair of transaction types includes the transaction type of that transaction request. Thus, in the illustrated embodiment, two age counters are stored based on the transaction type of an input transaction request. The age control circuit 40 may control the mux 44 to select the age counters dependent on the input transaction type. The mux 44 may represent the selection operation, and may be implemented in any desired fashion (e.g. muxes in parallel, each selecting one of the age counters to be stored in the transaction queue; or each age counter may be provided to a port on the transaction queue 46 and the age control unit 40 may generate write control signals to select which age counters are actually written to the transaction queue 46).

The transaction queue 46 may generally comprise any semiconductor memory or memories (e.g. random access memory (RAM) arrays, content addressable memory (CAM) arrays, registers, flops, latches, other clocked storage devices, or any combination thereof) arranged as a set of entries, where each entry is configured to store a transaction request and corresponding information. Exemplary entries 46A-46B are illustrated in FIG. 2. Each entry includes fields for the age counters corresponding to the transaction request (CTR1 and CTR2), a request field, and a status field. The request field may store the transaction request, which may include various information transmitted by the IOB 22 for the transaction request such as transaction type, address, size, control information, etc. The status field may be used to track the progress of the transaction, indicate its validity, etc.

In the present embodiment, a common transaction queue 46 stores transaction requests of all types. The head pointers 48A-48C may each identify the transaction request of the corresponding transaction type that is logically at the head of the transaction requests having the corresponding transaction type (i.e. the oldest transaction request of the corresponding transaction type). Particularly, the posted head pointer 48A may identify the oldest posted transaction request; the nonposted head pointer 48B may identify the oldest nonposted transaction request; and the completion head pointer 48C may identify the oldest completion request. The head pointers 48A-48C are provided to the transaction queue 46, which outputs the counters from the identified entries to the compare circuit 52. Additionally, in some cases, there may be tail pointers for each transaction type (not shown) that locate the most recent transaction request of that type in the transaction queue 46. Read and write pointers may be used in some embodiments.

The compare circuit 52 compares the counters that correspond to the same pairs of transactions, to detect which of the transactions is older. That is, the P-NP counter of the posted transaction request is compared to the P-NP counter of the nonposted transaction request; the P-CP counter of the posted transaction request is compared to the P-CP counter of the completion request; and the NP-CP counter of the nonposted transaction request is compared to the NP-CP counter of the completion request. Given the comparison results, the relative order of the oldest transaction of each type may be determined. Given this relative order and information indicating which transaction types are currently blocked, the issue control circuit 50 may select a transaction to issue (if at least one transaction is ready to issue). The issue control circuit 50 may transmit an issue pointer (Issue Ptr in FIG. 2) to the transaction queue 46, which may read the transaction request from the identified entry and may transmit the request to the PHY 36 for transmission on the PCIe interface.

More particularly, the issue control circuit 50 may select the oldest transaction type, as indicated by the comparison results, which is not blocked. By selecting the oldest nonblocked transaction type, fairness may be maintained since older transactions are preferred for selection. Furthermore, by permitting younger transaction types that are not blocked to pass the older, blocked transactions, the ordering rules indicated by the PCIe specification may be maintained.

In the illustrated embodiment, the compare circuit 52 may signal the comparison results as a set of signals. Each signal may be indicative of whether or not, for a given pair of transaction types, the oldest transaction having the low speed transaction type is older than the oldest transaction having the high speed transaction type. Thus, three signals are shown in FIG. 2. NP_OT_P may be asserted if the oldest nonposted transaction request is older than the oldest posted transaction request; NP_OT_CP may be asserted if the oldest nonposted transaction request is older than the oldest completion request; and CP_OT_P may be asserted if the oldest completion request is older than the oldest posted transaction request. Other embodiments may use different signals definitions.

An age counter circuit may generally comprise the circuitry to store an age counter and to update the age counter as transaction requests are received, responsive to control signals from the age control circuit 40. An age counter may be any value that may be used to determine the relative age of transactions. The details of one embodiment of the age counter circuit 42A are illustrated in FIG. 2, but any circuitry may be used in other embodiments including any Boolean equivalents of the circuitry shown. The age counter circuits 42B-42C may be similar to the age counter circuit 42A.

In the illustrated embodiment, the age counter circuit 42A includes a register 54 (or other clocked storage device such as flops or latches), an incrementor 56, and a mux 58. The register 54 includes an age counter (P-NP CTR, in FIG. 2) and a flag (F in FIG. 2). The register 54 is coupled to the age control circuit 40, coupled to output the age counter to the incrementor 56, coupled as an input to the mux 58, and coupled to receive the output of the mux 58 as an input. The output of the incrementor 56 is coupled as a input to the mux 58, which is coupled to receive selection control from the age control circuit 40. The output of the mux 58 is coupled as an input to the mux 44, along with the outputs of the age counter circuits 42B-42C.

The incrementor 56 increments the current age counter, providing an incremented output to the mux 58. The current age counter is provided to the mux 58 as well. If the age counter is to be incremented (e.g. the input transaction type differs from the most recent transaction type and is the low speed transaction type), the age control unit 40 may cause the age counter circuit 42A to increment the age counter. In the illustrated embodiment, the age control circuit 40 causes the mux 58 to select the incremented age counter from the incrementor 56, and forwards the incremented age counter to the mux 44 and to the input of the register 54 to replace the current age counter. If the age counter is not to be incremented (e.g. the input transaction type does not differ from the most recent transaction type, or the input transaction type is the high speed transaction type of the pair, or the input transaction type is not one of the pair assigned to the age counter circuit 42A), the age control circuit 40 causes the mux 58 to select the current age counter from the register 54. While the illustrated embodiment increments the age counter, other embodiments may decrement the age counter. Generally, references to updating the age counter may refer to changing the age counter's value (e.g. increment or decrement by any amount).

The flag (F) in the register 54 may be used in the current embodiment to record the most recent transaction type. For example, the flag may be a bit. If the bit is set, the most recent transaction type may be the high speed transaction type, and if the bit is clear the most recent transaction type may be the low speed transaction type. Other embodiments may reverse the meanings of the set and clear states or may use multibit indications. The age control circuit 40 may update the flag as various transactions having one of the pair of transaction types are received.

Generally, a first transaction request may be referred to as "passing" a second transaction request if the second transaction request is older than the first transaction request and the first transaction request is transmitted on the interface prior to the second transaction request. Transaction requests may pass other transaction requests according to specification-defined rules (e.g. PCIe passing rules) and/or according to implementation-dependent rules that do not violate the specification-defined rules. A first transaction request may be "older" than a second transaction request if the first transaction request was received prior to the second transaction request in time. Similarly, a first transaction may be "younger" than a second transaction request if the first transaction request was received subsequent to the second transaction request in time.

It is noted that, while the illustrated embodiment uses a common transaction queue 46 for all transaction types, other embodiments may have different constructions. For example, separate transaction queues may be used for each transaction type, or transaction types may be grouped into two or more groups for sharing common transaction queues. It is further noted that, in some embodiments, the peripheral interface controller 32 may control more than one PCIe interface. For example, the PHY 36 may include 24 SERDES lanes, programmable as either PCIe lanes or Ethernet. Up to 8 logical PCIe interfaces may be supported. Thus, 8 sets of age counter circuits 42A-42C may be supported. The age control circuit 40 may be configured to control the 8 sets, or separate age control circuits 40 may be provided for each set. The transaction queue 46 may be common to all 8 interfaces (with separate sets of head pointers 48A-48C for each interface), or separate transaction queues may be provided for each interface (and each transaction type within the interface, if desired). The compare circuit 52 and the issue circuit 50 may handle the 8 interfaces (either serially or in parallel), or separate compare circuits 52 and issue circuits 50 may be provided for each interface. More or fewer interfaces may be supported in other embodiments.

It is further noted that, while the above embodiment increments the age counter if the input transaction type differs from the most recent transaction type of the pair and if the input transaction type is the low speed transaction type, other embodiments may increment the age counter if the input transaction type differs from the most recent transaction type of the pair and if the input transaction type is the high speed transaction type. In such embodiments, a high speed transaction request and subsequent low speed transaction requests may have the same age counter until another high speed transaction request is encountered after a low speed transaction request. If age counters are equal between a high speed transaction request and a low speed transaction request, the high speed transaction request would be older in such an embodiment. Such an embodiment may be used, in some cases, to reduce the minimum number of bits in an age counter (e.g. if the high speed queue is deeper than the low speed queue).

Additionally, other interfaces or embodiments may vary the number of transaction types, and the number of age counter circuits 42A-42C may be varied. Generally, the number of combinations of pairs of N transaction types, where N is an integer greater than zero, may be given by (where "!" is factorial): N!/(2*(N−2)!). Additionally, the number of age counters selected for an input transaction may be N−1.

Figure 3:
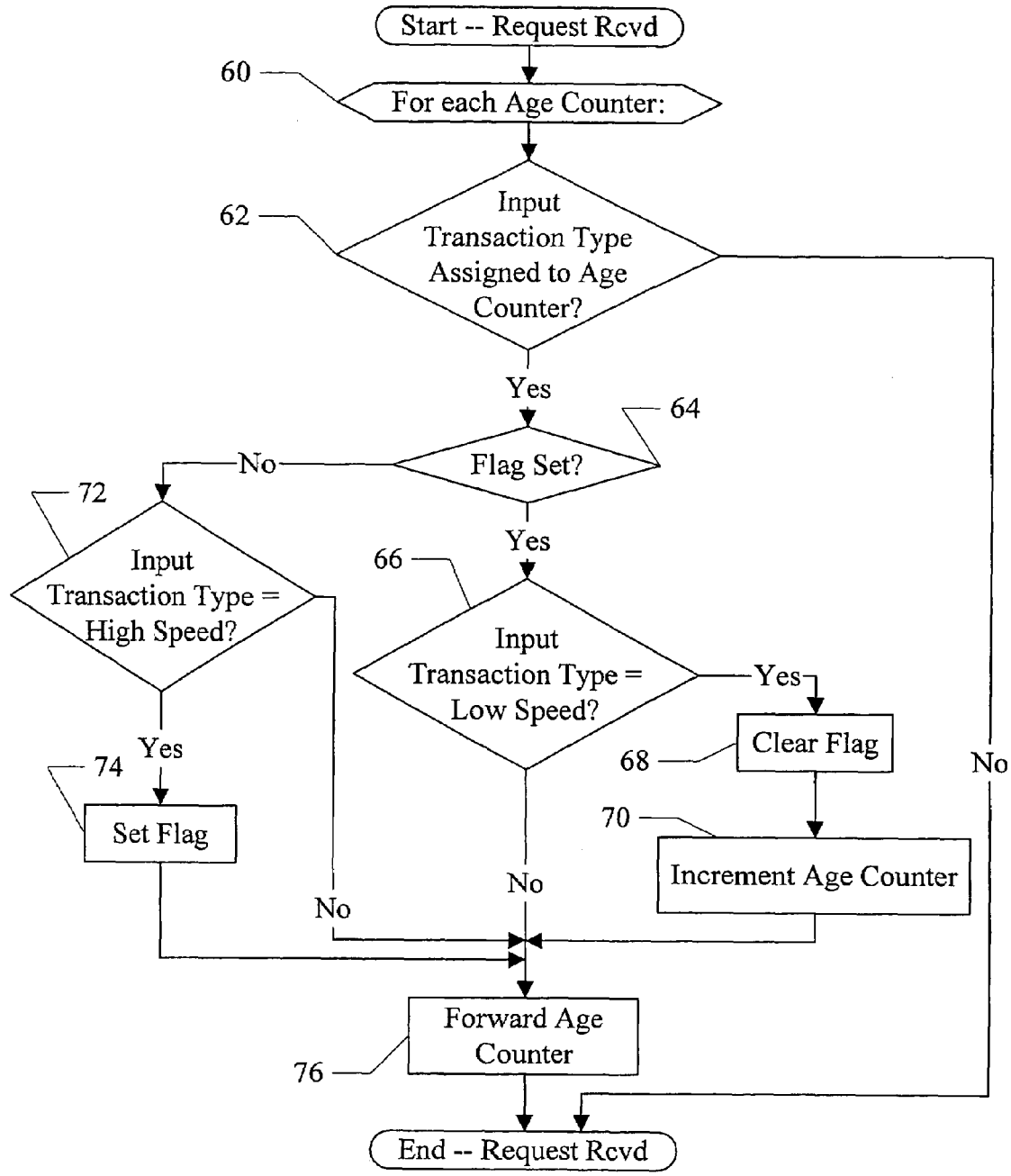
FIG. 3 is a flowchart illustrating operation of one embodiment of an age control circuit in response to receiving a transaction request.

Turning now to FIG. 3, a flowchart is shown illustrating operation of one embodiment of the age control circuit 40 responsive to receiving a transaction request. While the blocks are shown in a particular order for ease of understanding, any order may be used. Furthermore, blocks may be performed in parallel by combinatorial logic in the age control circuit 40. Blocks, combinations of blocks, or the flowchart as a whole may be pipelined over multiple clock cycles, in some embodiments. Blocks 62-76 in FIG. 3 may represent the operation of one age counter circuit 42A-42C, dependent on the input transaction type. The age control circuit 40 may implement independent operation for each age counter circuit 42A-42C (e.g. serially or in parallel), as illustrated by block 60 in FIG. 3.

If the input transaction type is not one of the pair assigned to the age counter circuit (block 62, "no" leg), the age control circuit 40 may take no action with regard to this age counter circuit. Other age counter circuits may be affected by the input transaction. If the input transaction type is one of the pair assigned to the age counter circuit (block 62, "yes" leg), the age control circuit 40 may respond dependent on the state of the flag F in the age counter circuit (decision block 64). If the flag is set (decision block 64, "yes" leg), and the input transaction type is the high speed transaction type of the pair (decision block 66, "no" leg), the age control circuit 40 may select the current (non-incremented) age counter for forwarding (block 76). If the flag is set (decision block 64, "yes" leg), and the input transaction type is the low speed transaction type of the pair (decision block 66, "yes" leg), the age control circuit 40 may clear the flag in the age counter circuit (block 68) and may increment the current age counter (e.g. by selecting the incremented age counter from the incrementor 56) (block 70). The incremented age counter may be forwarded (block 76). On the other hand, if the flag is clear (decision block 64, "no" leg) and the input transaction type is the high speed transaction type of the pair (decision block 72, "yes" leg), the age control circuit 40 may set the flag in the age counter circuit (block 74) and may forward the current (non-incremented) age counter (block 76). If the flag is clear (decision block 64, "no" leg) and the input transaction type is the low speed transaction type of the pair (decision block 72, "no" leg), the age control circuit 40 may forward the current (non-incremented) age counter (block 76).

Turning next to FIG. 4, a set of equations are shown illustrating calculation of the comparison results by one embodiment of the compare circuit 52 to generate the signals illustrated in FIG. 2. In this example, the low speed transaction's age counter is subtracted from the high speed transaction's age counter, modulo $2^M$ (where M is an integer equal to the number of bits in the age counter). If the result is less than $2^{M-1}$, the low speed transaction is older than the high speed transaction. Viewed in another way, the low speed's transaction counter may be subtracted from the high speed transaction's counter, and the sign of the result (inverted) may be the comparison result.

The equations of FIG. 4 are based on incrementing the age counters. If the age counters were decremented instead, the high speed counter would be subtracted from the low speed counter.

FIG. 5 is a table listing the values of the comparison result signals defined in FIG. 4 (left three columns of the table, labeled with the comparison output signal names) and the corresponding relative order of the oldest transaction requests (right column of the table, labeled "Relative Age") for one embodiment. In the table of FIG. 5, two of the combinations of values are not applicable (marked "NA" in the "Relative Age" column). The two non-applicable columns define logically impossible combinations that indicate circular orders in which no transaction request is the oldest. The remaining 6 combinations identify the 6 possible orders of the oldest transaction request of each transaction type, as shown in the "Relative Age" column of the table. For example, the first row of the table indicates that the oldest posted transaction request is older than the oldest completion request, which is older than the oldest nonposted transaction request; the second row of the table indicates that the oldest completion request is older than the oldest posted transaction request, which is older than the oldest nonposted transaction request; etc.

FIG. 6 is an equation defining the minimum size of M that may be used in the present embodiment. It can be shown that the minimum size given by the equation of FIG. 6 ensures that the age counters cannot overflow for any mix of transaction types. As mentioned above, M is an integer defining the number of bits in the age counters. For each transaction-type pairing, M is one greater than the base 2 logarithm of the maximum of either the low speed queue size or one greater than the high speed queue size. M may be calculated individually for each transaction type pairing. Alternatively, to keep a consistent size for all age counters, M may be set at the maximum M calculated across all pairings. In some embodiments, the queue sizes may be programmable (e.g. programmable portions of the transaction queue 46) and the sizes used in calculating M may be the maximum programmable size for each transaction type. As an example, if the maximum of the low speed queue size and one greater than the high speed queue size is 16 entries, M=5 is large enough. The equation of FIG. 6 may be the minimum size of M when both mandatory and non-mandatory passing rules are supported. If only mandatory passing rules are supported, the minimum size of M may be the base 2 logarithm of the low speed queue size (+1 if the high speed queue size is greater than the low speed queue size).

Figure 7:
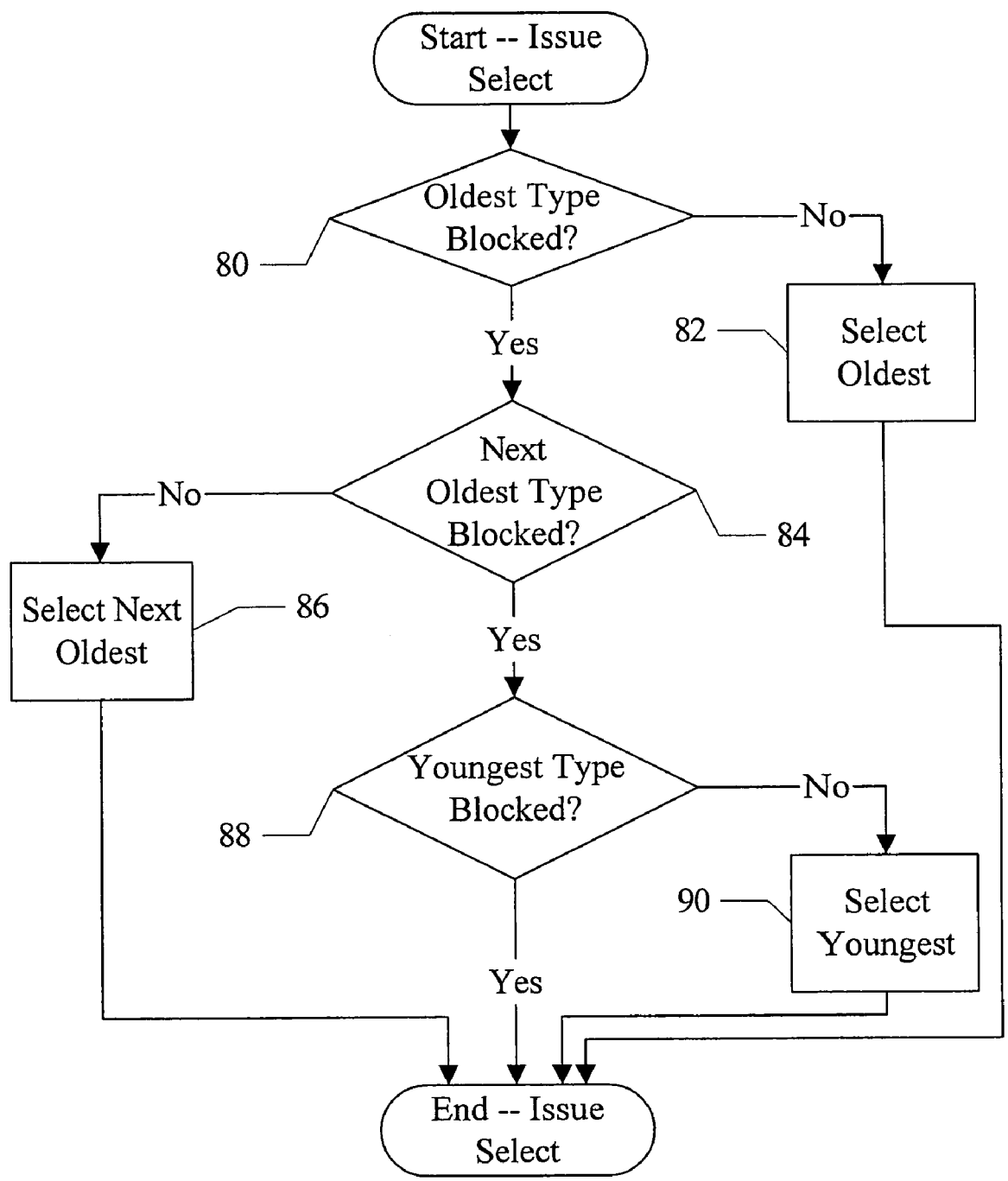
FIG. 7 is a flowchart illustrating operation of one embodiment of an issue control circuit shown in FIG. 2.

Turning now to FIG. 7, a flowchart is shown illustrating operation of one embodiment of the issue control circuit 50 to select a transaction request to issue. While the blocks are shown in a particular order for ease of understanding, any order may be used. Furthermore, blocks may be performed in parallel by combinatorial logic in the issue control circuit 50. Blocks, combinations of blocks, or the flowchart as a whole may be pipelined over multiple clock cycles, in some embodiments.

The issue control circuit 50 receives the comparison results from the compare circuit 52. If the oldest transaction type (that is, the transaction type of the oldest transaction request, as indicated by the comparison results) is not blocked (decision block 80, "no" leg), the issue control circuit 50 may select the oldest transaction request (block 82). If the oldest transaction type is blocked (decision block 80, "yes" leg) but the next oldest transaction type is not blocked (decision block 84, "no" leg), the issue control circuit 50 may select the oldest transaction request of the next oldest transaction type (block 86). The oldest transaction request of the next oldest transaction type is younger than the oldest transaction request and has a different transaction type than the oldest transaction request, but is older than the oldest transaction request of other transaction types. If the oldest transaction type is blocked (decision block 80, "yes" leg) and the next oldest transaction type is blocked (decision block 84, "yes" leg) but the youngest transaction type is not blocked (decision block 88, "no" leg), the issue control circuit 50 may select the oldest transaction request of the youngest transaction type (block 90). The oldest transaction request of the youngest transaction type is younger than the oldest transaction request of each of the other transaction types.

Transaction types may be blocked in a variety of ways. For example, in some embodiments, a credit system may be used on a transaction-type basis to identify available resources for that transaction type in receivers on the PCIe interface. If a credit is not available for a transaction type, that transaction type may be blocked until a credit is freed via completion of an earlier transaction. Additionally, a transaction type may be blocked if an older transaction request of another transaction type is in the queue and the transaction type is not permitted to pass the older transaction type according to the implemented passing rules. For example, if only the mandatory passing rules are implemented, the nonposted transaction type may be blocked if any older transaction type is in the queue. If the non-mandatory passing rules are implemented, the nonposted transaction type may be blocked if an older posted transaction type is in the queue.

While the embodiment of FIG. 7 handles three transaction types, other embodiments may extend to more or fewer transaction types and a similar process of selecting the oldest transaction type that is not blocked may be used.

Numerous variations and modifications will become apparent to those skilled in the art once the above disclosure is fully appreciated. It is intended that the following claims be interpreted to embrace all such variations and modifications.

What is claimed is:

1. A controller comprising:
   one or more transaction queues storing, during use, a plurality of transaction requests, each of the plurality of transaction requests having a transaction type;
   one or more age counter circuits generating, during use, one or more age counters, each of the age counters corresponding to a respective pair of transaction types; and
   a control circuit coupled to receive an indication of an input transaction type corresponding to an input transaction request to the controller and coupled to the one or more age counter circuits, wherein the control circuit selects at least one of the one or more age counters to be stored with the input transaction request in the one or more transaction queues, each of the at least one selected counters indicative of a relative age of the input transaction request with transaction requests of another transaction type, and wherein the control circuit conditionally causes, during use, an update of a first age counter for which the corresponding pair includes the input transaction type, wherein the control circuit does not cause the update responsive to the input transaction type being the same as the most recent transaction type of the corresponding pair, regardless of which of the corresponding pair is the input transaction type.

2. The controller as recited in claim 1 wherein the control circuit causes, during use, an update of the first age counter responsive to the input transaction type differing from the recent transaction type.

3. The controller as recited in claim 2 wherein the control circuit causes, during use, the update of the first age counter further responsive to transaction requests of the input transaction type being defined to not pass transaction requests of the most recent transaction type for deadlock prevention.

4. The controller as recited in claim 3 wherein the control circuit does not cause, during use, the update of the first age counter responsive to transaction requests of the input transaction type being defined as able to pass transaction requests of the most recent transaction type for deadlock prevention, even if the input transaction type differs from the most recent transaction type.

5. The controller as recited in claim 2 wherein the control circuit records, during use, the most recent transaction type in each of the one or more age counter circuits.

6. The controller as recited in claim 2 wherein the update comprises incrementing the first age counter.

7. The controller as recited in claim 2 wherein the control circuit forwards, during use, the updated first age counter for storage in the transaction queues with the input transaction request if the first age counter is updated.

8. The controller as recited in claim 1 wherein the one or more transaction queues output stored counters corresponding to an oldest transaction request of each transaction type in the one or more transaction queues, and the controller further comprising a compare circuit coupled to receive the stored counters output from the queue, wherein the compare circuit compares, during use, stored counters that are assigned to the same pairs of transaction types to generate a comparison result that is indicative of the relative order of the oldest transaction requests of each transaction type.

9. The controller as recited in claim 8 further comprising an issue control circuit coupled to receive the comparison result and to select the oldest transaction request, as indicated by the comparison result, that is not blocked.

10. A controller coupled to receive an input transaction request having an input transaction type that is one of a plurality of transaction types, the controller comprising:
    at least one age counter circuit generates, during use, at least one age counter, the age counter corresponding to a pair of the plurality of transaction types and maintained to indicate a relative age of transaction requests having the pair of transaction types; and
    a control circuit coupled to the age counter circuit, wherein the control circuit updates, during use, the age counter responsive to the input transaction type being one of the pair of transaction types and further responsive to the input transaction type differing from a most recent transaction type of the pair, wherein the most recent transaction type corresponds to a most recent transaction request of transaction requests having one of the pair of transaction types, and wherein the control circuit does not update the age counter responsive to the input transaction type being the same as the most recent transaction type of the corresponding pair, regardless of which of the corresponding pair is the input transaction type.

11. The controller as recited in claim 10 wherein transaction requests having a first transaction type of the pair of transaction types are defined to be able to pass transaction requests having a second transaction type of the pair for deadlock prevention, and wherein the control circuit causes, during use, the age counter circuit to update the age counter further responsive to the input transaction type being the second transaction type.

12. The controller as recited in claim 11 wherein the control circuit does not cause the age counter circuit to update the age counter during use, responsive to the input transaction type being the first transaction type, even if the input transaction type differs from the most recent transaction type.

13. The controller as recited in claim 10 wherein the control circuit records, during use, the most recent transaction type in the age counter circuit.

14. The controller as recited in claim 10 wherein the at least one age counter circuit comprises a plurality of age counter circuits, each corresponding to a respective pair of transaction types.

15. The controller as recited in claim 10 wherein updating the age counter comprises incrementing the age counter.

16. The controller as recited in claim 10 wherein the one or more transaction queues output, during use, stored counters corresponding to an oldest transaction request of each transaction type in the one or more transaction queues, and the controller further comprising a compare circuit coupled to receive the stored counters output from the queue, wherein the compare circuit compares, during use, stored counters that are assigned to the same pairs of transaction types to generate a comparison result that is indicative of the relative order of the oldest transaction requests of each transaction type.

17. The controller as recited in claim 16 further comprising an issue control circuit coupled to receive the comparison result and to select the oldest transaction request, as indicated by the comparison result, that is not blocked.

18. A method comprising:
  receiving an input transaction request having an input transaction type;
  selecting one or more age counters, wherein each of the one or more age counters corresponds to a respective pair of transaction types;
  storing the selected age counters with the input transaction request in one or more transaction queues, each of the selected age counters indicative of a relative age of the input transaction request with transaction requests of another transaction type;
  determining whether or not the input transaction type is the same as a most recent transaction type of the pair of transaction types corresponding to a first age counter of the one or more age counters;
  updating the first age counter responsive to the input transaction type different from the most recent transaction type; and
  not updating the first age counter responsive to the input transaction type being the same as the most recent transaction type of the corresponding pair, regardless of which of the corresponding pair is the input transaction type.

19. The method as recited in claim 18 wherein the updating is further responsive to transaction requests of the input transaction type being defined to not pass transaction requests of the most recent transaction type for deadlock prevention.

20. The method as recited in claim 19 wherein the updating is not performed responsive to transaction requests of the input transaction type being defined as able to pass transaction requests of the most recent transaction type for deadlock prevention, even if the input transaction type differs from the most recent transaction type.

21. The method as recited in claim 18 further comprising:
  outputting stored counters from the one or more transaction queues, the stored counters corresponding to an oldest transaction request of each transaction type in the one or more transaction queues;
  comparing the stored counters that are assigned to the same pairs of transaction types to generate a comparison result that is indicative of the relative order of the oldest transaction requests of each transaction type; and
  selecting the oldest transaction request, as indicated by the comparison result, that is not blocked.

* * * * *